(12) United States Patent
Nishino et al.

(10) Patent No.: US 7,314,369 B2
(45) Date of Patent: Jan. 1, 2008

(54) NOZZLE PRESSING MECHANISM

(75) Inventors: Satoharu Nishino, Nagoya (JP); Takashi Shinoda, Aichi-gun (JP)

(73) Assignee: Kabushiki Kaisha Meiki Seisakusho (JP)

(*) Notice: Subject to any disclaimer, the term of this patent is extended or adjusted under 35 U.S.C. 154(b) by 253 days.

(21) Appl. No.: 11/242,784

(22) Filed: Oct. 5, 2005

(65) Prior Publication Data
US 2006/0078646 A1  Apr. 13, 2006

(30) Foreign Application Priority Data
Oct. 7, 2004  (JP) ............... 2004-294716

(51) Int. Cl.
*B29C 45/00* (2006.01)
(52) U.S. Cl. ................ 425/574; 425/567; 425/569
(58) Field of Classification Search ............ 425/567, 425/569, 574
See application file for complete search history.

(56) References Cited

U.S. PATENT DOCUMENTS 5,855,829 A * 1/1999 Siegrist et al. ............. 264/40.1
6,790,028 B2 * 9/2004 Denkmaier .................. 425/574
7,131,835 B2 * 11/2006 Okazaki ..................... 425/570
2005/0008731 A1 * 1/2005 Okazaki ..................... 425/574
2006/0251758 A1 * 11/2006 Kang et al. ................. 425/567

FOREIGN PATENT DOCUMENTS

JP          35-7978         4/1935

* cited by examiner

*Primary Examiner*—Tim Heitbrink
*Assistant Examiner*—Emmanuel S Luk
(74) *Attorney, Agent, or Firm*—Browdy and Neimark, PLLC

(57) ABSTRACT

A mechanism for pressing a nozzle 26 of an injection device 10 against a die 33, comprises a hooking device 12 which moves so that a hooking body 23 hooks or does not hook on a to-be-hooked portion 24; and a traction device 11 having, on its one end, the hooking device 12 and having, on its other end, the injection device 10. In this mechanism, the portion of the hooking device 12, opposite to the side adjacent to the traction device 11 is attached to the die 33 in the vicinity of the portion of the die 33, against which the nozzle 26 is abutted.

6 Claims, 5 Drawing Sheets

NOZZLE PRESSING MECHANISM

BACKGROUND OF THE INVENTION

1. Field of the Invention

The present invention relates to a mechanism for pressing a nozzle of an injection device against a die.

2. Background Art

A mechanism for pressing a nozzle of an injection device against a die is disclosed in, for example, Japanese Examined Utility Model (U.M. Kokoku) No. 35-7978. U.M. Kokoku No. 35-7978 discloses a nozzle pressing mechanism in which one or two or more hydraulic cylinder devices are attached, via ball joints, to opposite surfaces of an injection device portion (a heating cylinder attaching surface) provided with an injection nozzle and a die attaching plate. Accordingly, even when the axis of the injection device is inclined from a horizontal position to adjust the abutment between the injection nozzle and the die, the axial direction of the hydraulic cylinder device can be easily changed and adjusted in accordance with variations of the axial direction of the injection device. Thus, this mechanism can be conveniently used. However, this mechanism protects only the hydraulic cylinder device. Namely, when the abutment between the injection nozzle and the die is adjusted as described above, the portion of the die, against which the injection nozzle is abutted is changed and, accordingly, a distance between the portion of a die attaching plate, to which the hydraulic cylinder device is attached, and the portion of the die, against which the injection nozzle is abutted, varies as shown in FIG. 5. Thus, the direction of pressure of the injection nozzle applied to the die by the hydraulic cylinder device is deviated from the axis of the injection nozzle (injection device). Consequently, a component force is applied to the injection nozzle in a direction perpendicular to the axis of the injection nozzle and, accordingly, molten material may leak through a gap between contact surfaces of the injection nozzle and the die, or the contact surface of the injection nozzle or the die may be damaged.

The heating cylinder is downwardly bent, due to its weight, because the injection nozzle is attached to a front end of the heating cylinder extending in an axial direction thereof and being heavy. Accordingly, the direction of pressure of the injection nozzle applied to the die by the hydraulic cylinder device is deviated from the axis of the injection nozzle (injection device). The occurrence of this phenomenon is more remarkable as the size of the injection device is increased. A component force is applied to the injection nozzle in a direction perpendicular to the axis of the injection nozzle in a manner similar to the above. Thus, the molten material may leak through a gap between contact surfaces of the nozzle and the die, the contact surface of the nozzle or the die may be damaged, and the degree of curve of the heating cylinder may be increased.

BRIEF SUMMARY OF INVENTION

The present invention provides a mechanism for pressing the nozzle of the injection device against the die, which can prevent the molten material from leaking through the portion of the die, against which the nozzle is abutted, and prevent the damage of the nozzle, the die or the heating cylinder. This mechanism is provided with a hooking device which moves so that a hooking body hooks or does not hook on a to-be-hooked portion; and a traction device having, on its one end, the hooking device and having, on its other end, the injection device. In this mechanism, the portion of the hooking device, opposite to the side adjacent to the traction device is attached to the die in the vicinity of the portion of the die, against which the nozzle is abutted.

BRIEF DESCRIPTION OF DRAWINGS

An embodiment of the present invention will be described below in detail with reference to the drawings.

DETAILED DESCRIPTION OF INVENTION

Figure 1:
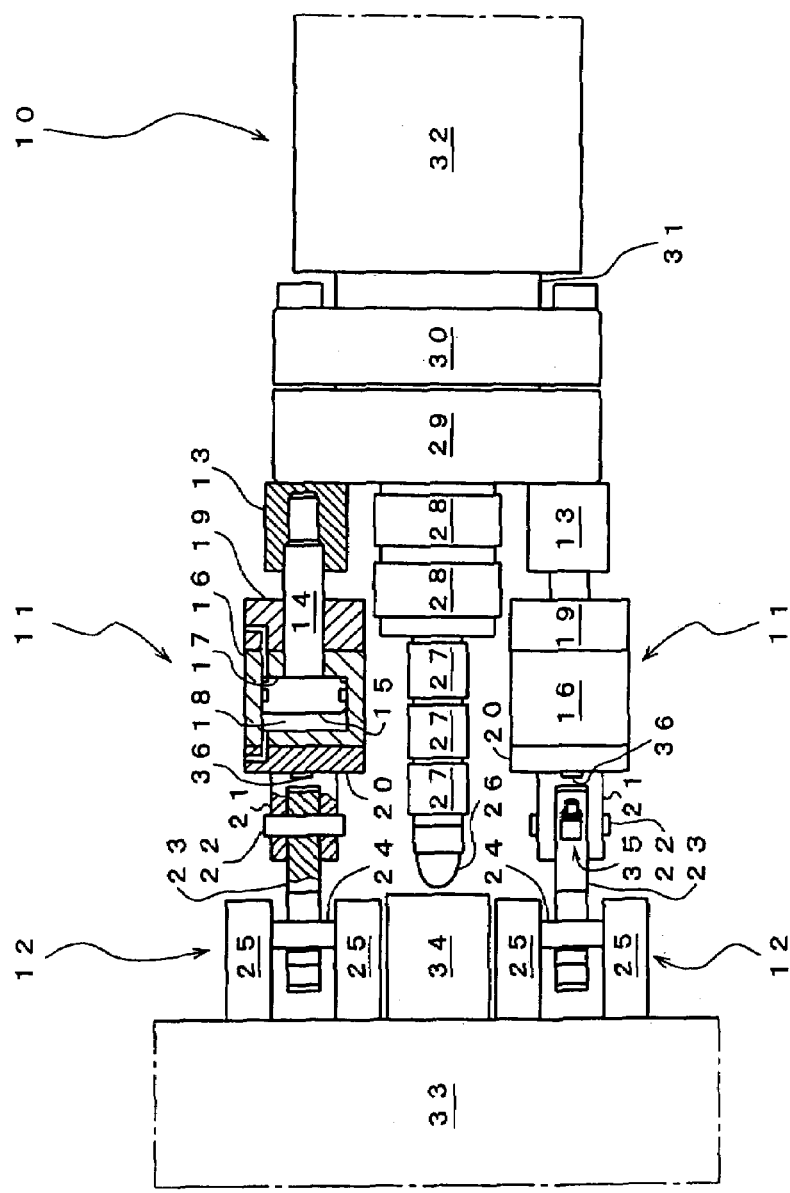
FIG. 1 is a front view of a nozzle pressing mechanism.
Figure 3:
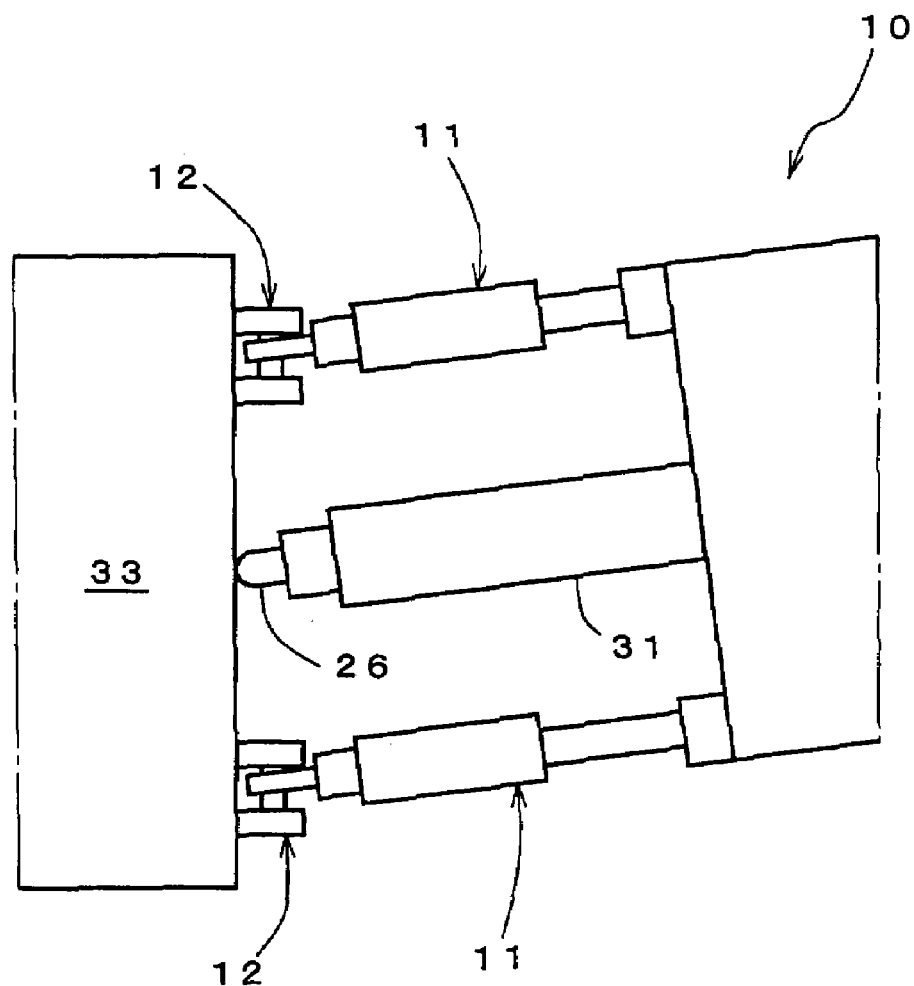
FIG. 3 is a front view of a nozzle pressing mechanism, in which an injection device is downwardly inclined to downwardly adjust the portion of a die, against which a nozzle is abutted.

As shown in FIGS. 1 and 3, an injection device 10 has, on its surface on the side of a die 33, i.e., on a heating cylinder attaching surface thereof, a heating cylinder 31. A cylinder head 29 is secured to a front end portion of the heating cylinder 31 via an attaching ring 30, and a nozzle 26 is screw-engaged in the front end surface of the cylinder head 29. Heaters 27, 28 are wound around the outer peripheral surfaces of the nozzle 26 and the cylinder head 29, respectively. A heater (not shown) is wound around the outer peripheral surface of the heating cylinder 31, and a cover 32 covers the heater. The heating cylinder 31, the cylinder head 29 and the nozzle 26 have respective center channels which are interconnected from the heating cylinder 31 to a front end of the nozzle 26. A screw or a plunger (not shown) is movably inserted in the center channel of the heating cylinder 31. The injection device 10 is provided with an injection-driving device (not shown) which moves the screw or the plunger in forward-and-backward directions. The screw or the plunger is backwardly moved, and molten material such as plastic is stored in the channel of the heating cylinder 31 ahead of the screw or the plunger. The stored molten material is pressed by the screw or the plunger moved in a forward direction by the injection-driving device, and is injected into a cavity in the die 33 via the nozzle 26 abutted with a sprue bush 34.

A traction device 11 and a hooking device 12 abut and press the nozzle 26 against the die 33 (sprue bush 34), and sets of the traction device 11 and the hooking device 12 are provided on both sides of the nozzle 26, respectively, to abut the nozzle 26 against the die 33 in balance. The traction device 11 is comprised of an attaching seat 13 secured to a front surface of the cylinder head 29; a piston rod 14 screw-engaged in the attaching seat 13; a piston 15 secured to a front end of the piston rod 14; a cylinder 16 into which the piston 15 is movably inserted; a rear plate 19 which is secured to the end face of the cylinder 16, adjacent to the piston rod 14, and which has a passage interconnected to a traction chamber 17 of the piston 15; and a front plate 20 which is secured to the end face of the cylinder 16, opposite to the piston rod 14 and which has a passage interconnected to an open chamber 18 of the piston 15.

Figure 2:
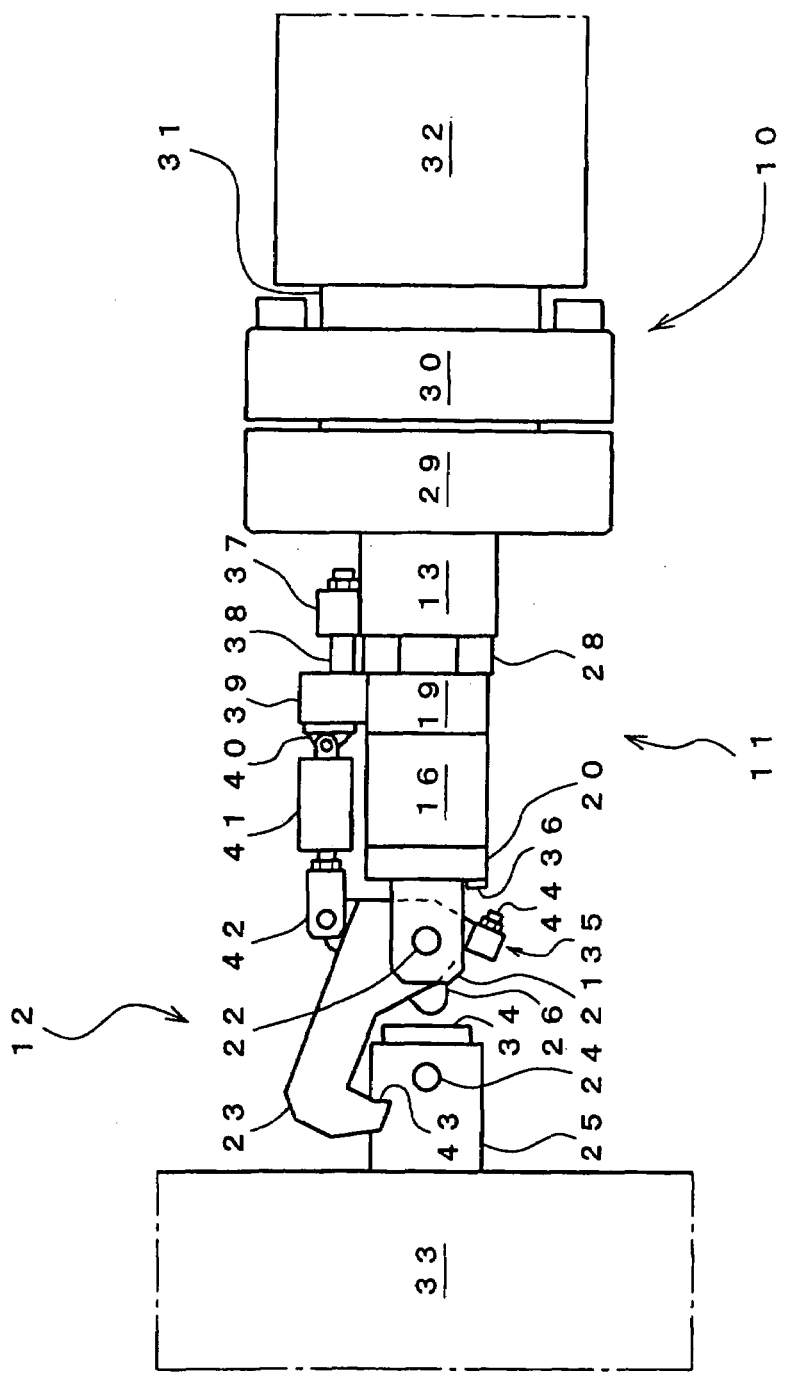
FIG. 2 is a plan view of a nozzle pressing mechanism.

As shown in FIGS. 1 and 2, the hooking device 12 is comprised of a supporting body 21 having a C-shaped and unopened bottom portion secured to the front plate 20; a hooking body 23 pivotably provided in a C-shaped and opened portion of the supporting body 21 via a shaft pin 22, and having a hook-shaped hook portion 43; a to-be-hooked portion 24 made of a round bar, which is hooked by the hook portion 43 of the hooking body 23; and a supporting column 25 which supports the both ends of the to-be-hooked portion 24 and which is secured to a surface of the die 33. The to-be-hooked portion 24 is made of a linear round bar. However, it may be shaped like an arc projected toward the shaft pin 22 so that the hooking body 23 can be effectively hooked on the to-be-hooked portion 24 when moves in a direction perpendicular to the hook portion 43. It is preferable that an appropriate clearance is provided between the hook portion 43 and the supporting column 25. Further, in the hooking device 12, the supporting body 21 may be secured to the die 33, and the supporting column 25 may be secured to the front plate 20 in a relationship reverse to the above embodiment.

The die 33 may be either of a stationary die and a movable die. The nozzle 26 is designed to be abutted on the sprue bush 34 provided on a side face of the die 33. Alternatively, the nozzle 26 may abut onto a die-contact surface between the stationary die and the movable die to carry out a parting injection. In this respect, the supporting column 25 for one of two hooking devices 12 and the supporting column 25 for the other hooking device 12 are attached to any one of or both of the stationary die and the movable die. In the embodiment, the supporting column 25 is attached to the die 33. However, the supporting column 25 may be designed to be attached to a stationary plate to which the stationary die is attached, and the nozzle 26 may be designed to movably penetrate through the stationary plate to abut on the stationary die.

As shown in FIG. 2, an attaching seat 37 is secured to a side face of the attaching seat 13, and a rod 38 is secured to the attaching seat 37. The rod 38 is movably inserted into an inner hole of an attaching seat 39 secured to a side face of the rear plate 19. This mechanism prevents the cylinder 16 from pivoting on an axis of the piston rod 14, to keep the hooking body 23 and the to-be-hooked portion 24 in a preferable positional relationship.

One end of an open/close-driving portion 41 is connected, via a joint 40, to the surface of the attaching seat 39, opposite to a surface to which the rod 38 is inserted. The other end of the open/close-driving portion 41 is coupled to a joint 42. The joint 42 is pivotably supported by a shaft on a side face of the hooking body 23 so that the open/close-driving portion 41 and the joint 40 can oscillate in the same plane. It is preferable that the open/close-driving portion 41 is comprised of a hydraulic cylinder device or a pneumatic cylinder device. However, it may be comprised of an electromagnet or the like. With such a structure, in the hooking body 23, the open/close-driving portion 41 causes the hook portion 43 to pivot on the shaft pin 22.

A locking portion 35 is provided on the side face of the hooking body 23, opposite to the side face to which the joint 42 is attached, with respect to the shaft pin 22. In the locking portion 35, a bolt 44 is screw-engaged in a surface of a cubic member and is prevented from rotating by a nut. The locking portion 35 is provided on a side face of the hooking body 23 so that the top of the bolt 44 is opposed to the hook portion 43 of the hooking body 23 with respect to the shaft pin 22. The amount of projection of the top of the bolt 44 is adjusted so that the top of the bolt 44 abuts with an abutting seat 36 provided on a front face of the front plate 20 when the hook portion 43 arrives at a line passing through the to-be-hooked portion 24 and the shaft pin 22 by pivoting the hooking body 23 using the open/close-driving portion 41.

Operation of a nozzle pressing mechanism according to the embodiment of the present invention will be described below in detail. When molten material is stored in the front portion of the heating cylinder 31 of the injection device 10, the open/close-driving portion 41 is driven so as to decrease the length thereof to pivot the hooking body 23 in a clockwise direction in FIG. 2. When the hooking body 23 is not hooked onto the to-be-hooked portion 24, the injection device 10 is moved closed to the die 33 by forward/backward-driving device (not shown). In a conventional art disclosed in U.M. Kokoku No. 35-7978, a hydraulic cylinder device corresponds to the forward/backward-driving device, and the hydraulic cylinder device has not only a function to drive an injection nozzle in forward-and-backward directions but also a function to press the injection nozzle against a die. Therefore, a large cylinder device having a large effective pressure-receiving area is required. Contrary to this, the forward/backward-driving device used in the embodiment of the present invention requires only a relatively small output necessary to move the injection device 10 in forward-and-backward directions. Accordingly, a small cylinder device having a small effective pressure-receiving area or the like is sufficient. In the embodiment of the present invention, the traction device 11 to press a nozzle against a die is extremely small because it does not require a function to move the injection device in forward-and-backward directions, and has only a small stroke obtained by slightly increasing the play of the hooking device 12.

The injection device 10 forwardly moved by the forward/backward-driving device stops when the nozzle 26 abuts with the sprue bush 34 or reach a position slightly before the abutting position. The open/close-driving portion 41 is driven so as to increase the length thereof, to pivot the hooking body 23 in a counterclockwise direction until the top of the bolt 44 of the locking portion 35 abuts with the abutting seat 36 and, thus, the hooking body 23 can be hooked on the to-be-hooked portion 24. Then, pressurized oil is supplied to the traction chamber 17 of the traction device 11 to backwardly move the piston rod 14 and, accordingly, the traction device 11 is contracted. Thus, a tensile force occurs between the cylinder head 29 and the die 33 to press the nozzle 26 against the sprue bush 34. It is preferable that the traction device 11 is a hydraulic cylinder device, as shown in the drawing, that is small and outputs high power. However, the traction device 11 may be another device such as an electric motor.

When the nozzle 26 is pressed against the sprue bush 34 by a sufficient pressure, an injection-driving device (not shown) of the injection device 10 moves a screw or a plunger (not shown) in a forward direction, to inject a molten material to a cavity of the die 33 via the nozzle 26 and the sprue bush 34. After that, the pressurized oil that has been supplied to the traction chamber 17 of the traction device 11 is shifted to the open chamber 18 to project the piston rod 14. Thus, the engagement between the hooking body 23 and the to-be-hooked portion 24 is released. Depending on the state of a molding operation, it is possible to prepare the hooking body 23 for a next molding cycle without pivoting the hooking body 23, when the hooking body 23 is kept to be hooked on the to-be-hooked portion 24, or the engagement between the hooking body 23 and the to-be-hooked portion 24 is released as described above. In a molding operation in which it is necessary to sufficiently space the nozzle 26 from the sprue bush 34 after the injection of the molten material, after the engagement between the hooking body 23 and the to-be-hooked portion 24 is released, the hooking body 23 pivots in a clockwise direction, and the injection device 10 is backwardly moved by forward/backward-driving device (not shown). It should be noted that such a mechanism, in which the injection device 10 along with the traction device 11 is backwardly moved to be easily separated and spaced from the hooking device 12, is remarkably effective for solving problems often occurred, due to molten material, in the vicinity of the die 33 and the nozzle 26.

As the portion of the die 33, which is pressed by the nozzle 26, or the position of the sprue bush 34 vary depending on the die, it is necessary to adjust the state of the nozzle whenever the die is replaced. Accordingly, the injection device 10 is provided with a mechanism to cause the nozzle 26 to pivot and downwardly/upwardly incline so that the position of the front end of the nozzle 26 can move to a predetermined area. FIG. 3 is a front view exaggeratedly showing the injection device 10 which is downwardly inclined by the above downwardly/upwardly inclination mechanism, to abut the nozzle 26 against a relatively lower portion of the die 33. As can be seen from FIG. 3, in the nozzle pressing mechanism according to the embodiment of the present invention, the traction devices 11, 11 are secured in a direction identical to the heating cylinder 31, and the hooking device 12 has a gap provided between the hooking body 23 and the to-be-hooked portion 24 in a direction perpendicular to the hook portion 43. Accordingly, even when the axis of the nozzle 26 is inclined, the direction of pressure applied to the die 33 by the nozzle 26 coincides with the axis of the nozzle 26. Therefore, a component force is not applied to the nozzle 26 in a direction perpendicular to the axis thereof. Thus, the molten material is prevented from leaking through a gap between contact surfaces of the nozzle 26 and the die 33 or the like, and the contact surface of the nozzle 26 or the die 33 is not damaged.

Figure 5:
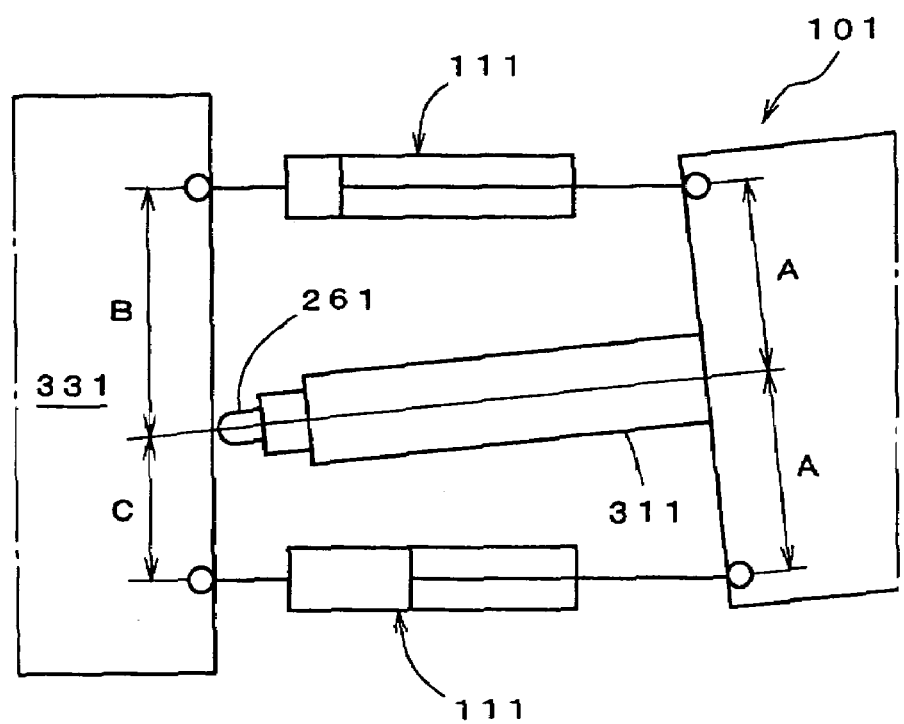
FIG. 5 is a front view of a conventional nozzle pressing mechanism, in which an injection device is downwardly inclined to downwardly adjust the portion of a die, against which a nozzle is abutted.

Based on FIG. 5, a conventional nozzle pressing mechanism in which an injection device is downwardly inclined to downwardly adjust an abutment position between a nozzle and a die, will be described. Ends of cylinder devices 111, 111 are attached to a heating cylinder attaching surface of an injection device 101 so that they are spaced, at an equal distance A, from the axis of a heating cylinder 311. The other ends of the cylinder devices 111, 111 are attached to a die 331 so that they are spaced, at an equal distance A, from the axis of the heating cylinder 311 (axis of a nozzle 261), assuming that the axis of the heating cylinder is perpendicular to the die 331. When the injection device 101 is downwardly inclined so as to abut the nozzle 261 against a lower position of the die 331, a distance B between the abutment position of the nozzle 261 and the upper cylinder device 111 is larger than the distance A, and a distance C between the abutment position of the nozzle 261 and the lower cylinder device 111 is smaller than the distance A. Therefore, the direction of pressure output from the cylinder devices 111, 111 is deviated from the axis of the nozzle 261, and a component force occurs. Thus, the molten material may leak through a gap between contact surfaces of the nozzle 261 and the die 331 or the like, and the contact surface of the nozzle 261 or the die 331 may be damaged.

Figure 4:
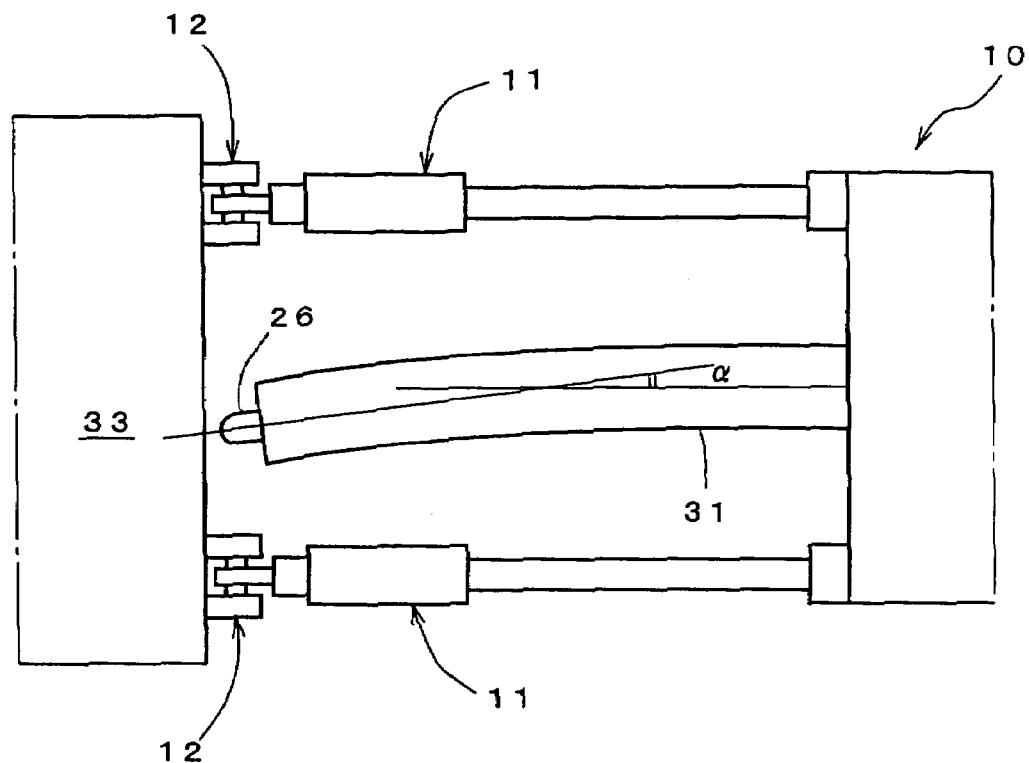
FIG. 4 is a front view of a nozzle pressing mechanism, in which the traction device is attached to a heating cylinder attaching surface of an injection device.

As shown in FIG. 4, even if the nozzle pressing mechanism according to the present invention is constructed by attaching the traction devices 11 to the heating cylinder attaching surface of the injection device 10, the heating cylinder 31 in a large molding machine is downwardly bent, due to its weight, because it extends in an axial direction thereof and is heavy. In such a state, due to an angle á representing the curve of the heating cylinder 31, the molten material may leak through a gap between contact surfaces of the nozzle 26 and the die 33, the contact surface of the nozzle 26 or the die 33 may be damaged, and the degree of curve of the heating cylinder 31 may be increased, in a manner similar to the above conventional art.

In order to solve this problem, it is preferable that the traction devices 11 are provided on not the heating cylinder attaching surface of the injection device 10 but a front portion of the heating cylinder 31, so as not to be affected by the curve of the heating cylinder 31. Accordingly, in the best mode of the present invention (FIG. 1, FIG. 2), the traction devices 11 are provided on the cylinder head 29. However, the traction devices 11 may be provided on the other position of a front portion of the heating cylinder via an additional attachment or the like.

The traction devices 11 are provided on the cylinder head 29, so that the size of the nozzle pressing mechanism can be reduced, and the attachment positions of the traction devices 11 can be set at positions closest to the portion of the die 33, against which the nozzle 26 is abutted. Accordingly, a distance between the portions of the die 33, to which one hooking device 12 and the other hooking device 12 are attached, respectively, can be minimized. Therefore, the deformation of the die 33 occurred due to pressure of the nozzle 26 applied to the die 33 between the both hooking devices 12 can be reduced and, accordingly, the deformation of a cavity of the die can be reduced. Thus, a precisely molded product can be obtained.

What is claimed is:

1. A nozzle pressing mechanism for pressing a nozzle of an injection device against a die, comprising
    a hooking device which moves so that a hooking body hooks or does not hook on a to-be-hooked portion; and
    a traction device having, on its one end, the hooking device and having, on its other end, the injection device, wherein
    the portion of the hooking device, opposite to the side adjacent to the traction device is attached to the die in the vicinity of the portion of the die, against which the nozzle is abutted.

2. A nozzle pressing mechanism according to claim 1, wherein the traction device is provided on a front portion of a heating cylinder of the injection device.

3. A nozzle pressing mechanism according to claim 1, wherein the hooking body of the hooking device has a hook portion, and the to-be-hooked portion is made of a round bar.

4. A nozzle pressing mechanism according to claim 2, wherein the hooking body of the hooking device has a hook portion, and the to-be-hooked portion is made of a round bar.

5. A nozzle pressing mechanism according to claim 2, wherein the traction devices are provided on both sides of the nozzle in front of a cylinder head.

6. A nozzle pressing mechanism according to claim 5, wherein the hooking body of the hooking device has a hook portion, and the to-be-hooked portion is made of a round bar.

* * * * *